3,086,952
ADHESIVE COMPOSITION COMPRISING A POLY-
ISOCYANATE AND A PARTIALLY DISSOLVED,
PARTLY SUSPENDED COPOLYMER OF VINYL
CHLORIDE AND VINYL ACETATE IN ORGANIC
SOLVENT
Charles G. Newton, Jr., Newburyport, Mass., assignor,
by mesne assignments, to United Shoe Machinery Corporation, Boston, Mass., a corporation of New Jersey
No Drawing. Filed June 7, 1960, Ser. No. 34,357
2 Claims. (Cl. 260—32.8)

This invention relates to adhesives and particularly to tying adhesives for improving the union between a base and molded-on plastic bodies.

Molding of plastic shoe soles directly on the bottoms of shoe uppers eliminates a number of shoemaking operations involved in mechanically or adhesively attaching a shoe sole. One molding process involves holding a sole mold against the bottom of a shoe upper and injecting heat softened plastic into the mold. The plastic material conforms to and supports the bottom of the shoe upper, and the edges and bottom of the molded-on plastic sole need little or no finishing.

A major difficulty in the resultant shoe has been separation of the sole from the shoe after limited wear. Pretreatments such as roughing and application of various tying adhesives or primer coatings to the bottom of the shoe upper were tried but an undesirably high percentage of failures was still obtained. A number of factors were responsible for these failures; but after careful study of the failures, it was believed that the failures were due in large measure to one or both of two factors. One of these factors was failure of the adhesive to establish firm bonding relation with the bottom of the shoe upper. A second factor was lack of strength and poor resistance to "cold flow" of the adhesive coating initially or after a relatively short period.

It is an object of the present invention to provide a tying adhesive which will sharply reduce or eliminate separation of fibrous surfaces such as bottoms of shoe uppers and bodies of resin such as shoe soles molded against such surfaces.

To this end and in accordance with the present invention, I have provided an improved tying adhesive by combining a resin in a special physical relation with a volatile organic solvent and a liquid reactive to form a solid reaction product. This combination gives, when applied to a fibrous surface such as the bottom of a shoe upper, a tying adhesive deposit which insures strong and permanent union between bodies of resin molded against such surface.

The tying adhesive of the present invention comprises a high molecular weight vinyl chloride polymer resin carried in a volatile organic solvent for the resin together with a plasticizer for the resin and a polyisocyanate. The physical state in which the resin is present insures for the combination both low viscosity for good wetting power and ability to penetrate fibrous surfaces, and high final hardness and resistance of the tying adhesive to softening by plasticizer from the molded-on resin body.

The special state of the resin in the adhesive is that obtained by severe shearing type agitation of fine particles of the vinyl chloride polymer resin in the organic solvent. It appears that some portion of the resin dissolves in the solvent to form a relatively low viscosity continuous phase and that undissolved portions of the resin particles take up and are swelled by the solvent. The special relationship avoids on the one hand, the high viscosity which is characteristic of high molecular weight vinyl chloride polymer resin solutions and which would prevent effective wetting and/or penetration of the adhesive. On the other hand, it insures a sufficient resin content in the tying adhesive for effective action. In addition it is believed that the solvent in the residual particles improves their ability to soften and establish bonds when the hot fluid resin is molded against an adhesive coated surface.

Vinyl chloride polymer resins for use in the present adhesive are the high molecular weight polymers of vinyl chloride with up to 10% of vinyl acetate or polymers of vinyl chloride alone. The high molecular weight of the resin is of primary importance since with low molecular weight resins substantial difficulty has been encountered with separation of soles from uppers. In general, useful resins will have an intrinsic viscosity of at least 0.8 and the preferred resins have intrinsic viscosities of over 1.

Intrinsic viscosity is a convenient term for reporting molecular weights of vinyl resins and is defined as:

$$N = \frac{N_{sp}}{C} \text{ as } C \text{ approaches } 0$$

where $$N_{sp} = \frac{\text{flow time of solution}}{\text{flow time of solvent}} - 1$$

and C=concentration in grams/100 ml. of solution.

Intrinsic viscosities reported herein were carried out using 1% solutions of the resin in cyclohexanone and an Ostwald-Fenske viscosimeter. Not only is the high molecular weight of the resin important to secure a permanent bond but because of the reduced solubility of the higher molecular weight resins, formation and maintenance of the special relationship of the resin to the solvent is more easily secured. It is to be noted that where resins dissolve completely on initial mixing or on standing, there is a substantial tendency of solutions containing the desired amount of resin to form a gel which interferes with smooth application of the material.

The particle size of the resin material is important to secure the desired relation of solvent and resin. Good results have been obtained with a finely divided resin of which substantially all will pass through a #100 standard sieve and about 80% will pass through a #80 standard sieve. These sieves have openings respectively of 0.0166 inch and 0.007 inch.

Methyl ethyl ketone is the preferred solvent for use in the present adhesive but other solvents have been used, for example, a mixture of equal parts of cyclohexanone and toluene has been used. Tetrahydrofurane has high solvent power for the vinyl chloride polymer resins and enables solution of even the high molecular weight homopolymers of vinyl chloride, but is undesirable in many relationships because of its odor.

High solids concentrations are preferred, with viscosity and coating ability as the limiting factors. In general, about 5% of vinyl chloride polymer based on the weight of the adhesive will give effective adhesive tying and 15% by weight has been the upper concentration above which it is difficult to apply the material.

The composition may contain up to 100 parts of plasticizer with 100 parts of the resin; but it is preferred not to use over about 75 parts and it is possible to form useful adhesive compositions containing no plasticizer. Conventional plasticizers such as dioctyl phthalate, tricresyl phosphate and polymeric plasticizers such as the polyester material known as Paraplex G-25 may be used. Polymeric plasticizers offer the advantage that they do not migrate.

The resin and solvent and the plasticizer, if used, are brought to the desired special relationship by introducing them into a shearing type agitator, for example, the well-known Waring Blendor, and beating the mixture until the liquid becomes somewhat hazy. This ordinarily occurs in something less than five minutes in a one-quart capacity mixer. The material is preferably beaten until it has a viscosity as determined on the Brookfield viscometer using a No. 3 rotor at 20 r.p.m. and 25° C. of between about 300 and about 400 c.p.s. This material if brushed out on a surface dries by evaporation of a solvent to form a continuous, somewhat hazy film with microscopically observable plastic granules held therein.

A polyisocyanate is added to the resulting mixture in amount of from 5% to 100% by weight based on the weight of the resin. There does not appear to be any reaction between the resin and the polyisocyanate but ordinarily the isocyanate material is not added to the remaining components until a day or two before use to avoid difficulties from absorption of moisture. A wide variety of polyisocyanates may be used including methylene bis(4-phenyl isocyanate), polyarylene polyisocyanate (PAPI), 2.4 tolylene diisocyanate, mixtures of 2.4 and 2.6 tolylene diisocyanate, triphenylmethane triisocyanate and various blocked polyisocyanates such as the the reaction product of trimethylolpropane and tolylene diisocyanate and phenol-blocked isocyanates. Also, reaction products of a diisocyanate such as tolylene diisocyanate with a polyester glycol such as propylene glycol monoricinoleate in a mol ratio of 2 to 2½ mols of diisocyanate to 1 mol of the polyester glycol may be used. Other useful reaction products are those of tolylene diisocyanate with polypropylene glycol and with 1.4 butane diol in the same mol ratio.

The following example is given as of possible assistance in understanding the invention and it is to be understood that the invention is not restricted to the materials, proportions or procedures of the example:

*Example*

92 parts by weight of methyl ethyl ketone were introduced into a "Waring Blendor" and there were then added 8 parts by weight of a hight molecular weight copolymer of vinyl chloride and vinyl acetate in the ratio of about 96 parts of vinyl chloride and 4 parts of vinyl acetate and having an intrinsic viscosity of 1.14, the copolymer resin being in the form of particles of which about 80% will pass through a #80 standard sieve. Next, 6 parts by weight of polypropylene glycol sebacate with an average molecular weight of 8000, hydroxyl number of 14 and having an acid number of 2 (Paraplex G-25) were added and the "Blendor" set in operation. The mixture was subjected to agitation in the "Blendor" for about 5 minutes, at the end of which time the liquid had become hazy and somewhat more viscous, the viscosity being between 300 and 400 c.p.s. as determined on the Brookfield viscometer using a No. 3 rotor at 20 r.p.m. and 25° C. On examination of the material it was found that a film deposited by evaporating a brushed out layer of the material on a glass plate deposited a somewhat cloudy film with clearly visible undissolved particles therein.

To the mixed materials there were then added 12 parts by weight of a 50% solution of methylene bis(4-phenyl isocyanate) in monochlorobenzene. A coating of this material was applied by a brush to the roughed bottom portion of a shoe upper and allowed to dry.

Thereafter a sole was molded onto the bottom of the upper using a conventional injection molding composition comprising polyvinyl chloride resin and about 95% by weight based on the weight of the resin of conventional ester type plasticizers. Molding was carried out in conventional apparatus using a molding temperature of 350° to 375° F.

After the sole had been molded on, the shoe upper and the molded-on sole were removed from the apparatus and it was found that the sole was strongly held to the upper.

Having thus described by invention, what I claim as new and desire to secure by Letters Patent of the United States is:

1. A tying adhesive for improving the union between fibrous shoe upper material and a sole of thermoplastic polymeric material solidified from heat softened condition in contact with said shoe upper material, said adhesive comprising a volatile organic solvent, from about 6% to about 15% by weight based on the weight of the adhesive of a high molecular weight resin polymer of vinyl chloride with up to 10% of vinyl acetate having an intrinsic viscosity of at least about 0.8, a plasticizer for said resin and an aromatic polyisocyanate, said resin being partially dissolved and partly suspended as fine particles in said solvent to give a viscosity at 25° C. of between about 300 and about 400 centipoises by shearing-type agitator beating in said volatile organic solvent of said resin as particles of which prior to beating all pass through a sieve having openings of 0.0166 in. and 80% pass through a sieve having openings of 0.007 in. to effect solution of said resin to an extent leaving undissolved portions of said resin particles microscopically observable, and said polyisocyanate being present in amount of 5% to 100% by weight based on the weight of said resin.

2. A tying adhesive for improving the union between fibrous shoe upper material and a sole of thermoplastic polymeric material solidified from heat softened condition in contact with said shoe upper material, said adhesive comprising a volatile organic solvent comprising methyl ethyl ketone, from about 6% to about 15% by weight based on the weight of the adhesive of a high molecular weight resin polymer of vinyl chloride with up to 10% of vinyl acetate having an intrinsic viscosity of at least about 1, a polymeric plasticizer for said resin and methylene bis(4 phenylisocyanate), said resin being partially dissolved and partly suspended as fine particles in said solvent to give a viscosity at 25° C. of between about 300 and about 400 centipoises by shearing-type agitator beating in said volatile organic solvent of said resin as particles of which prior to beating all pass through a sieve having openings of 0.0166 in. and 80% pass through a sieve having openings of 0.007 in. to effect solution of said resin to an extent leaving undissolved portions of said resin particles microscopically observable, and said methylene bis(4 phenylisocyanate) being present in amount of from about 5% to about 100% by weight based on the weight of said resin.

References Cited in the file of this patent

UNITED STATES PATENTS

| | | |
|---|---|---|
| 2,851,436 | Forsythe | Sept. 9, 1958 |
| 2,891,876 | Brown et al. | June 23, 1959 |
| 2,979,423 | Weinberg | Apr. 11, 1961 |